United States Patent [19]

Sontheimer et al.

[11] Patent Number: 4,702,162
[45] Date of Patent: Oct. 27, 1987

[54] SALAD SPINNER DRYER APPARATUS ROTATED BY SPEED REDUCING FRICTION DRIVE FOR USE WIH FOOD PROCESSORS

[75] Inventors: Carl G. Sontheimer, Greenwich; James E. Williams, Stamford, both of Conn.

[73] Assignee: Cuisinarts, Inc., Greenwich, Conn.

[21] Appl. No.: 38,231

[22] Filed: Apr. 14, 1987

[51] Int. Cl.4 .......................... A47J 43/04; F26B 17/24
[52] U.S. Cl. ............................................ 99/495; 34/58; 99/511; 210/360.1; 241/282.1
[58] Field of Search ................ 99/485, 495, 516, 503, 99/508, 511–513, 355, 479; 210/360.1, 363, 369, 378, 381; 241/282.1; 34/58

[56] References Cited

U.S. PATENT DOCUMENTS

| | | | |
|---|---|---|---|
| 3,753,297 | 8/1973 | Mantelet | 34/58 |
| 4,090,310 | 5/1978 | Koff | 99/479 X |
| 4,114,286 | 9/1978 | Bingham | 99/495 X |
| 4,194,697 | 3/1980 | Lembeck | 241/282.1 |
| 4,209,916 | 7/1980 | Doyel | 34/58 |
| 4,321,756 | 3/1982 | Mosely | 34/58 |

*Primary Examiner*—Timothy F. Simone
*Attorney, Agent, or Firm*—Parmalee, Bollinger & Bramblett

[57] ABSTRACT

A salad spinner dryer attachment is provided for a food processor having a base housing containing an electrical motor drive with a deck located on top of the base housing for removably mounting a working bowl thereon in predetermined engaged fixed position and having a tool drive shaft projecting vertically above the deck which drive shaft is rotatable by the motor drive at a first rotational speed around a main vertical axis of rotation. The attachement has an upstanding auxiliary bowl removably mountable upon the deck in place of the working bowl in the predetermined engaged fixed position. This auxiliary bowl has an uninterrupted side wall and a bottom trough for catching and holding any water which drains down its inside surface. A slotted basket is rotatably mountable in the auxiliary bowl to rotate around the main vertical axis at a second rotational speed substantially less than the first rotational speed of the tool drive shaft. A removable coupling sleeve is engageable with the tool drive shaft for rotating thereby about the main axis and has an exterior friction drive surface concentric with the main vertical axis with a radius "r" from this vertical axis. The auxiliary bowl carries a plurality of rotatable wheels whose perimeters roll against said exterior frictional drive surface. A driven rotor member is rotatable about the main axis and has an interior friction drive surface concentric with the main axis with a radius "R" larger than radius "r" of the exterior drive surface on the coupling sleeve. The perimeter of the wheels rolling against the interior friction drive surface of radius R turns the driven rotor member at a reduced second rotational speed which is considerably less than the first rotational speed as a function of radius r divided by radius R. Accordingly, components of salads such as lettuce, spinach and other greens, deposited in the rotatably basket are spun by the basket with water therefrom being thrown against the side wall of the auxiliary bowl to be deposited in the trough thereion for drying the salad.

20 Claims, 3 Drawing Figures

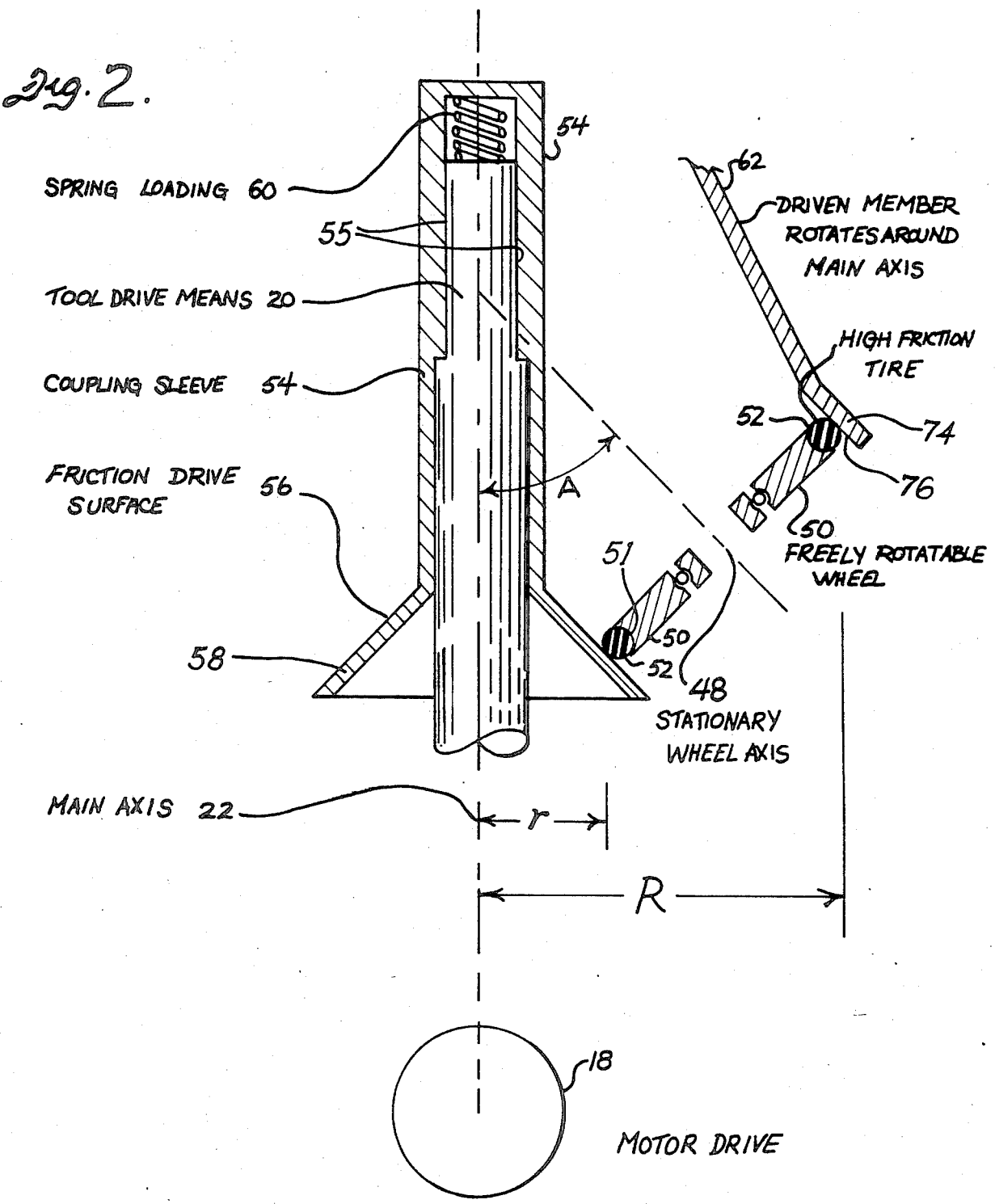

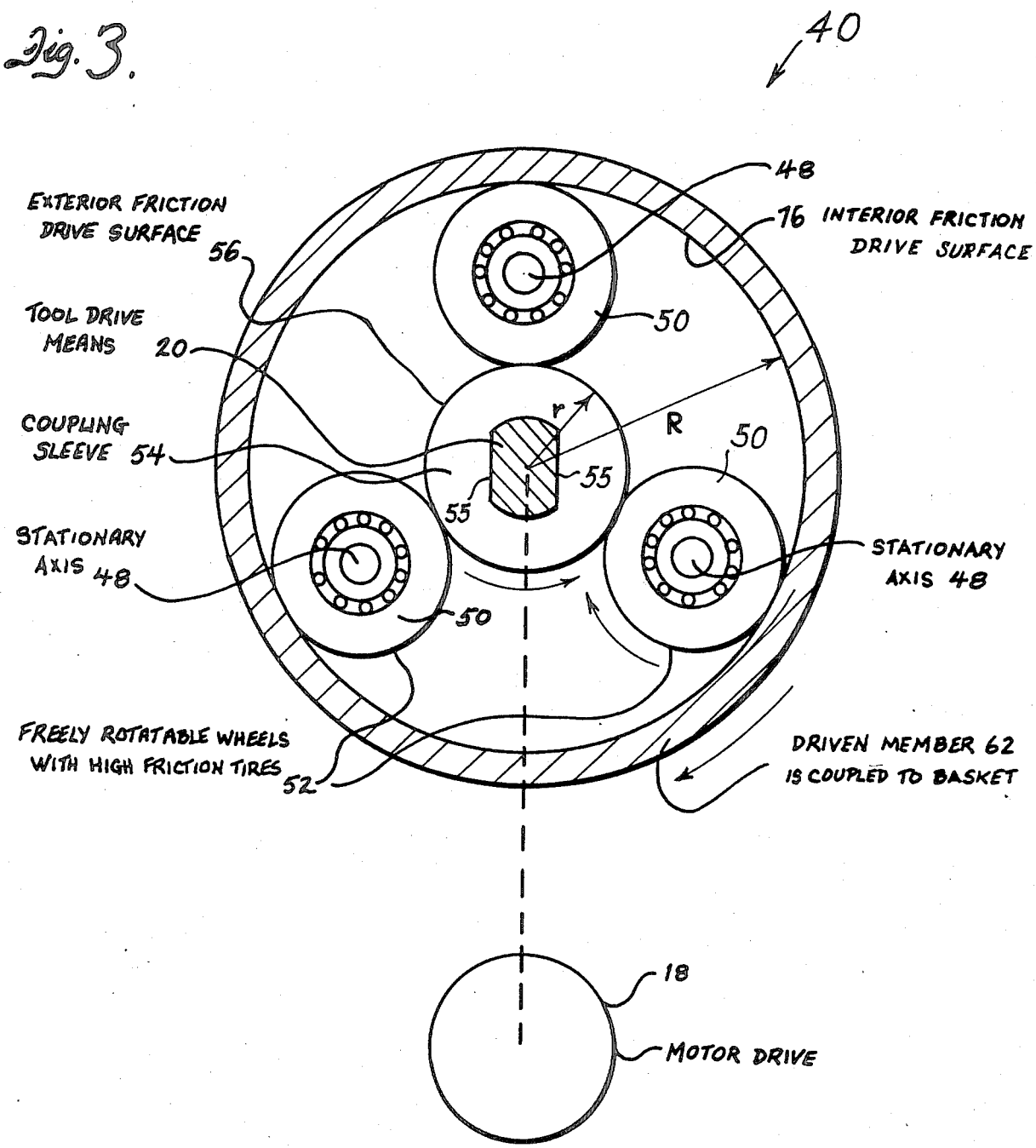

SALAD SPINNER DRYER APPARATUS ROTATED BY SPEED REDUCING FRICTION DRIVE FOR USE WIH FOOD PROCESSORS

BACKGROUND

This invention relates to food processor apparatus, and more particularly, to a salad spinner dryer attachment for an existing electrical appliance with a motor drive such as a food processor base containing a motor drive with an upstanding, vertical tool drive shaft to which various food processor tools are attached to be driven thereby.

Food processors are versatile, multi-function machines which may be utilized for performing a variety of food processing operations. The illustrative embodiment of the present invention is employed as an attachment to food processors of the type having a removable working bowl with motor driven tool drive means extending into the bowl with which various selected rotary food processing tools can be engaged to be driven for performing various food processing operations in accordance with the desires of the users. The bowl is removably mountable on the deck of a food processor base housing containing a motor drive and having a tool drive shaft extending upwardly from the base housing deck. This tool drive shaft rotates at a normal operating rate of spped, for example, in the range from about 1650 to about 1800 RPM or somewhat more or less depending upon the particular motor drive in the base housing.

In preparing salads, particularly leaf-type greens such as lettuce, spinach and the like, it is desirable and customary to wash the salad greens as the first step in preparing the salad. The problem is that the greens thereafter retain too much wetness which undsirably dilutes the dressing applied thereto, thus detracting from the appearance and taste of the salad, because of the wet greens and diluted, dripping salad dressing. This wetness problem has resulted in the creation and use of salad spinners in which the salad greens are placed to be spun manually to throw off excess water. Otherwise, the user would be required to dry the salad greens individually with paper towels and or physically hand shake the greens, all of which is time consuming and not totally satisfactory.

Accordingly, it would be desirable to provide this salad-spinner dryer function as an attachment for a food processor which would save time and do a better job automatically. Instead of a separate appliance, the consumer would use an attachment for an existing food processor thereby extending the use of that appliance to perform as a salad spinner dryer.

SUMMARY OF THE DISCLOSURE

Accordingly, it is an object of this invention to provide a salad spinner dryer attachment for a food processor which is mountable on the base housing deck of an existing food processor to be driven by the tool drive shaft.

Another object of this invention is to provide a novel salad spinner dryer attachment for a food processor which may be utilized with existing models of food processors having upstanding, vertically extending tool drive shafts.

Among the technical advantages of this invention are those resulting from the fact that a novel salad spinner dryer attachment for a food processor is provided which employs a friction-wheel-driven, speed-reducing transmission for speed reduction thereby simplifying the attachment and avoiding a positively-driven spinning basket.

Still a further object of this invention is to provide a novel salad spinner dryer attachment which can easily and conveniently be attached and disengaged from the upstanding tool drive shaft of a food processor and which is convenient and easy to mount in operating position on the deck of the base housing.

In carrying out this invention in one illustrative embodiment thereof, a salad spinner dryer attachment is provided for a food processor of the type having a base housing containing an electrical motor drive, said base housing having a deck on which a working bowl is removably engageable in a predetermined fixed position with the motor drive having an upstanding rotatable tool drive shaft extending upwardly from the deck and being rotated around a vertical first axis of rotation by the motor drive at a predetermined first rotational speed. An auxiliary bowl has a central concavity to accommodate receipt of the tool drive shaft when the auxiliary bowl is mounted on the deck in said predetermined position. This auxiliary bowl has an annular bottom trough for capturing and retaining water which is spun off from salad greens into the auxiliary bowl in a salad drying operation. A perforated basket is rotatably mountable in the auxiliary bowl to be coupled to the tool drive shaft extending upwardly into the concavity in the auxiliary bowl. A removable coupling sleeve is engageable with the tool drive shaft and has an exterior friction drive surface concentric with the first axis of rotation. Speed reduction transmission wheel means having a wheel perimeter are coupled between said first exterior friction drive surface and an internal frictional drive surface associated with the rotatable basket for frictionally driving the rotatable basket. The speed reduction wheel means have a stationary axis of rotation different from said first axis of rotation and the speed reduction is a function of the ratio of the radius "r" of said exterior friction drive surface and the radius "R" of said internal frictional drive surface engaged by the wheel perimeter. Salad greens placed in the perforate rotatable basket are spun dried with the thrown-off water being collected in the annular trough of the auxiliary bowl.

Among the many advantages provided by the salad spinner dryer attachment of the present invention are its ability to be readily engaged and disengaged from the housing deck of a food processor and its being driven at a desired reduced speed by a non-complex speed-reducing frictional drive transmission including wheen means and thereby avoiding positive drive of the spinning basket. The salad dryer attachment is quick and effecient, easy to install and remove and quickly dries the salad greens at an optimum speed of rotation and optimum centirfugal effect.

BRIEF DESCRIPTION OF THE DRAWINGS

The invention, together with further objects, aspects, advantages and features thereof will be more clealry understood from the following description considered in conjunction with the accompanying drawings in which like elements bear the same reference numerals throughout the various views.

FIG. 2 is an enlarged and simplified partial elevational sectional view of a speed-reducing frictional drive transmission including the tool drive means of a food processor, a coupling sleeve having an exterior friction drive surface engaged upon the tool drive means for turning a freely rotatable wheel for rotating a driven member about the main axis at reduced speed relative to the tool drive.

FIG. 3 is a diagrammatic plan view of this speedreducing friction drive transmission for turning the driven member at reduced speed relative to the tool drive. The salad spinner basket is frictionally coupled to this driven member for rotation therewith at such reduced speed optimum for spinning salad greens to obtain the desired centrifugal force.

DESCRIPTION OF THE PREFERRED EMBODIMENTS

Figure 1:
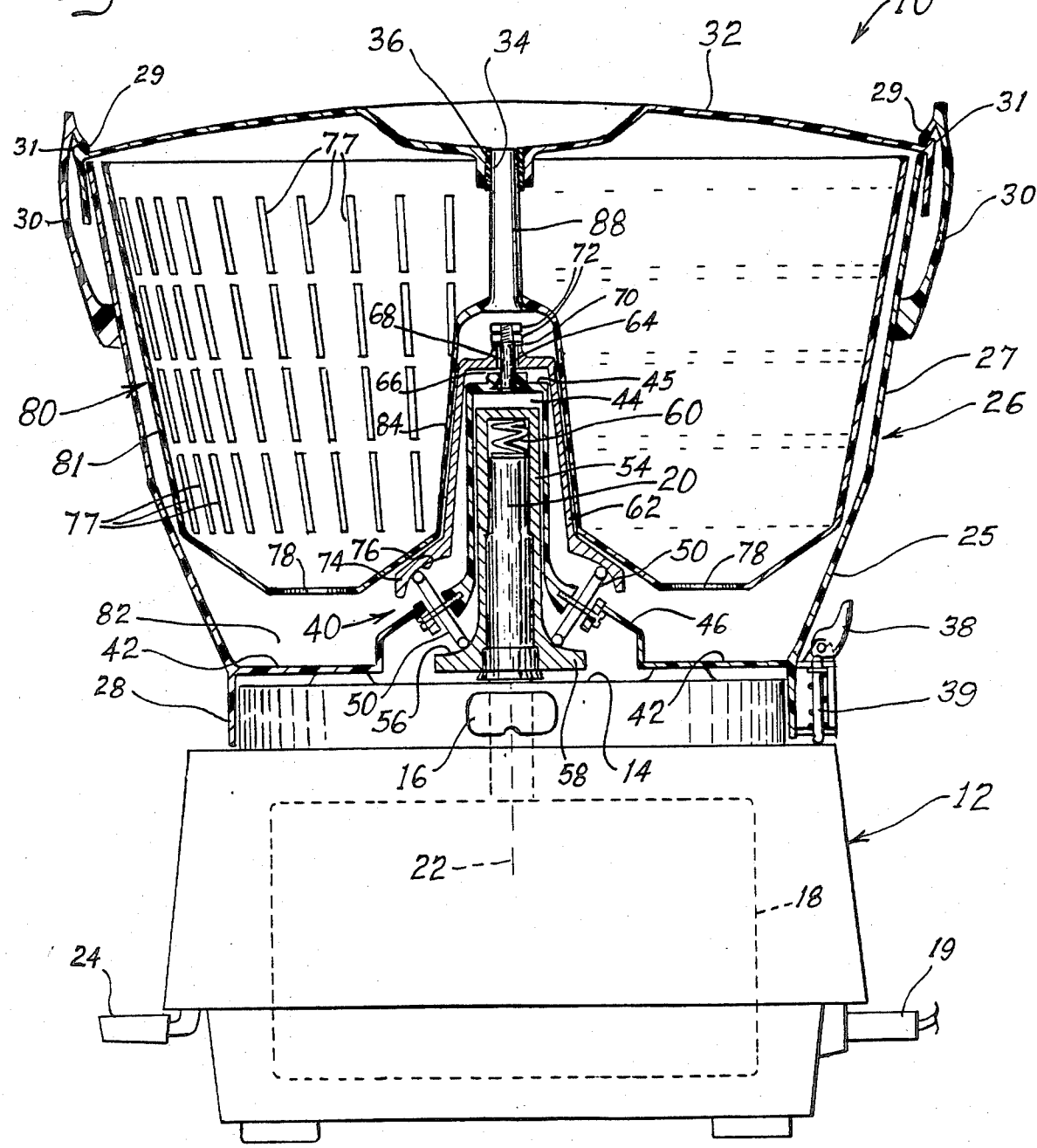
FIG. 1 is an elevational view of a base housing of a food processor illustrating the salad spinner dryer attachment positioned thereon, and being shown in cross-section.

Referring now to FIG. 1, a salad spinner dryer attachment 10 is shown on the base housing 12 of a food processor in place of the usual food processor working bowl (not seen) which has been temporarily removed and set aside. The base housing 12 includes a deck 14 having a circular configuration with mounting lugs 16 extending radially therefrom on opposite sides. Such a base housing 12 is more fully described in U.S. Pat. Nos. 4,226,373—Williams, and 4,406,603—Williams and houses an electric motor drive 18 which is energized by a power cord 19 via a switch (not shown) which is shown and described in the aforesaid patents and includes an upstanding vertical tool drive shaft 20 which rotates around a main vertical rotational axis 22. Manually operable switch levers 24 (only one is seen) are provided for controlling operation of the food processor motor drive 18.

The salad spinner dryer attachment apparatus 10 includes an upstanding auxiliary bowl 26 having a downwardly extending skirt 28 with recesses therein (not shown) which are adapted to engage the lugs 16 for mounting the auxiliary bowl 26 in a predetermined fixed position on the deck 14 of the base housing 12. The terminology "auxiliary bowl" is utilized to distinguish this special bowl 26 of the salad spinner dryer attachment apparatus 10 from the conventional working bowl (not shown) normally employed by a food processor and having a vertical circular cylindrical side wall. This auxiliary bowl 26 has an upwardly outwardly flaring truncated conical side wall. The lower section 25 of this side wall 26 is inclined outwardly at a larger angle to the central axis 26 than the upper section 27. The auxiliary bowl 26 includes a plurality of resilient clips 30 on its upper periphery for holding a removable cover 32 on the bowl 26 during operation. These clips 30 each include a tab 29 which engages over a bead 31 on the rim of the cover 32 and is released by manually flexing the resilient clip.

The cover 32 has a central opening 34 encircled by a plastic bearing sleeve 36 which is adapted to receive a rotatable shaft of the apparatus as will be described later. The auxiliary bowl 26 carries a manually operable pivoted lever cam 38 for depressing a spring-loaded actuator rod 39 which actuates a switch (not shown) in the base housing 12 for enabling the motor drive 18 to be operated only when the auxiliary bowl 26 is properly located in a predetermined fixed position on the deck 14.

In order to accommodate a speed-reducing frictional drive transmission 40, the auxiliary bowl 26 is characterized by having a bottom surface 42 which is formed with an upstanding central concavity or chamber 44 therein, and the lower portion of this chamber 44 is formed by a concentric side wall 46 which is sloped upwardly and inwardly with respect to the main axis of rotation 22. This side wall 46 has mounted therein three rotary drive transmission wheels 50 (Please see also FIGS. 2 and 3.) each of which freely turns on its stationary wheel axis 48. These wheels 50 are ball bearing mounted on their respective axles (axes) 48 as shown in FIG. 3 providing very low-friction rotation of each wheel. The wheels 50 have high frictional tires 52 mounted thereon, which for example may be provided by O-rings of resilient rubber-like material, such as rubber, neoprene, or polyurethane, mounted around the concave rim 51 of each wheel, as shown in FIG. 2.

The upstanding central cylindrical chamber 44 surrounds the upstanding tool drive shaft 20. A removable coupling sleeve 54 is mounted on the tool drive shaft 20 and is positively driven by engaging on flats 55 of the shaft 20. This coupling sleeve 54 has a downwardly and outwardly flaring external lower frictional drive surface 56 extending skirtlike therefrom. As seen in FIGS. 1 and 2, the tires 52 of the angled wheels 50 are adapted to ride on and frictionally engage the downwardly, outwardly sloping frictional drive surface 56 on the outwardly flared skirt 58 of the coupling sleeve 54. A compression spring 60 is seated between the upper end of the tool drive shaft 20 and the top of the coupling sleeve 54 for thrusting this coupling sleeve upwardly, thereby spring-loading the flared skirt 58 upwardly against the perimeter of the wheels 50 for increasing the frictional engagement between the tires 52 of the wheels 50 and the frictional drive surface 56.

A driven rotor member 62 is mounted on a stub shaft 64 for rotation about the main axis 22. This stub shaft 64 is anchored in the top wall 45 of the chamber 44 and has a bearing sleeve 68 on which said rotor member 62 rotates, being held thereon by a washer 70 and lock nuts 72. The rotor member 62 is terminated in a downwardly and outwardly flared skirt 74 having an interior frictional drive surface 76 which is concentric with the main axis 22. There is clearance 66 between the top 45 of the bowl concavity or chamber 44 and the underside of the top of the rotor member 62 for allowing gravitational force to press the flared skirt 74 down against the tires 52. As will be seen in FIGS. 1 and 2 the tires of the wheels 50 thus frictionally engage and drive the interior frictional skirt surface 76, and accordingly, rotate the rotor member 62 about the shaft 64 anchored in the top wall 45 of the chamber 44.

The salad spinner dryer apparatus 10 includes a perforated, rotatable basket 80 having an upwardly outwardly flaring side wall 81 extending generally parallel with the upper side wall section 27 of the bowl 26. Perforations in the basket are illustrated in FIG. 1 as a plurality of side wall slots 77 and bottom drainage slots 78 which function to permit centrifugal throw-off and drainage of any water on salad greens being spun by the basket. This removed water drains into a ring-shaped trough 82 formed in the bottom 42 of the auxiliary bowl 26. This annular trough 82 concentrically encircles the axis 22. The basket 80 has a hollow hub 84 formed therein with an inner surface of generally conical configuration which conforms with and mates in frictional engagement with the outer surface of the rotor member 62 to provide a frictional drive relation therebetween in the manner of a clutch-like frictional engagement which causes the basket 80 to be driven by the rotor member 62 but immediately allows the basket 80 to slip safely relative to the rotor member 62 so that the basket can immediately stop turning in the event that any unexpected impedance is encountered, for example by a kitchen utensil inadvertently dropped unseen by the operator into the basket 80 along with a cluster of salad greens.

The basket hub 84 carries a vertical shaft 88 which extends upwardly along the main axis 22 when the basket 80 is mounted on the rotor 62 in the auxiliary bowl 26. The shaft 88 is anchored to the hub 84 and is adapted to be positioned in the bearing sleeve 36 located in the central opening 34 of the removable cover 32 in order to stabilize the rotational movement of the basket 80 about the main axis 22. The configuration of the hollow hub 84 with the complementary mating conical taper of the rotor 62 provides a taper fit enhanced by gravitational loading due to the weight of the basket 80 as well as the weight of its contents, thereby ensuring a good frictional fit enabling the driving of the basket 80 by the rotor member 62.

The speed-reducing function performed by the friction drive transmission 40 of the salad spinner dryer apparatus 10 of the present invention will now be described with reference to FIGS. 2 and 3. As already explained, the normal rotational speed of the tool drive shaft 20 is in the range from about 1,650 RPM to about 1,800 RPM around the main vertical axis of rotation or may be somewhat more or less, depending upon the particular motor drive arrangement 18 in the housing 12. This normal speed is unsuitable for a salad spinning drying function, because it is much too fast and excessive centrifugal effects would damage or bruise or change the configuration or appearance of the salad greens spun at that unsuitably excessive rate of speed. Accordingly, the coupling sleeve 54 has a frictional drive surface 56 with a radius "r" and the wheels 50 have tires 52 rolling against that surface at that radius "r". At the same time, the rotor member 62 has an interior frictional surface 76 bearing on the tires 52 at a radius "R" from the main axis 22. Each stationary wheel axis 48 is oriented at an angle A to the main axis 22.

It will be seen that the (output) driven radius R is considerably larger than the (input) drive radius r. Accordingly, the perimeter of the wheel 50 rolling against the interior friction surface 76 will turn the rotor member 62 at a second rotational speed which is less than the first rotational speed of the tool drive shaft 20. The speed reduction is proportional to the ratio of r divided by R. Thus, the rotational speed of the driven rotor member 62 is expressed by this equation:

Rotational speed of the driven rotor member 62 = (1)

$$\frac{r}{R} \times \text{rotational speed of tool drive means 20.}$$

Since the basket 80 is frictionally seated on the rotor member 62 driven at this reduced rotational speed, the basket will likewise be rotated with a speed which will be equal to r/R × the speed of the tool drive 20.

As is illustrated in FIG. 3 the symmetrical wheel drive transmission 40 thus includes three wheels 50 each driven around a stationary wheel axis 48 between the exterior friction drive surface 56 of the coupling sleeve 54 and the interior friction drive surface 76 of the rotor member 62. The symmetry provided by the three wheels evenly drives the basket 80 which frictionalaly seats on the rotor member 62 in a stable reduced speed condition for performing the salad drying operation. The speed reduction will therefore depend on the radius r and the radius R which may be varied in the separation of the frictional surfaces by the size of the wheels and the angle A of each stationary wheel axis with the main axis 12. The angle A of each wheel axis is preferably in the range from 15° to 45° and the ratio of the radius r to radius R is preferably in the range from about 0.10 to about 0.30 for providing a reduced rotational speed in the range of about 165 RPM to about 540 RPM representing several revolutions per second. By utilizing several revolutions per second the salad drying function can be quickly performed with no damage to the dried greens.

A number of advantages are provided by orienting the wheel axes each at the angle A: (1) The spring 60 can spring-load the frictional surface 56 upwardly against the tires 52 at the bottom of each wheel. (2) Gravitational pull can load the frictional surface 76 downwardly against the tires 52 at the top of each wheel. (3) Relatively large diameter wheels 50 can be accommodated which are considerably larger than the difference between the radii "r" and "R". (4) These relatively large diameter wheels turn more slowly and last longer than tiny wheels. (5) The tires 52 of these relatively large wheels 50 have a larger footprint against the frictional surfaces 56 and 76 for providing better traction.

The salad spinner dryer attachment 10 is easily installed on the base housing 12 by removing its standard working bowl and first applying the coupling sleeve to the drive shaft 20 and then mounting the auxiliary bowl in its fixed position on the lugs 16 of the deck 14. The basket 80 is then seated on the rotor member 62. The salad greens to be dryed are inserted therein, and the cover 32 is attached to the bowl with the shaft 88 being inserted in the central opening 34 of the cover 32. The spinning function will be completed in relatively few seconds, and the attachment 10 may then be removed thereby readying the base housing 12 to have its conventional working bowl mounted thereon for the performance of additional food processing func- tions.

In a modified embodiment, the member 32 spanning across the top of the auxiliary bowl 26 and being held by the clips 30 is a bridge member, instead of a transparent cover member, for enabling the user to see more clearly down into the rotating basket 80 for watching the salad spinning operation.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. For use with having a base housing containing an electrical motor drive, with a deck located on top of the base housing for removably mounting a working bowl thereon in predetermined engaged fixed position, and having tool drive means projecting above said deck and being rotatable by said motor drive at a first rotational speed in the range of about 1,650 PRM to about 1,800 RPM around a main vertical axis of rotation, salad spinner apparatus comprising:
- an upstanding auxiliary bowl removably mountable upon said deck in said predetermined engaged fixed position thereon,
- said upstanding auxiliary bowl having an uninterrupted side wall and a bottom trough for catching and holding any water which drains down the inside surface of said side wall,
- a removable coupling sleeve engageable with said tool drive means for rotation thereby about said main vertical axis,
- said coupling sleeve having an exterior friction drive surface concentric with said main vertical axis,
- said exterior friction drive surface having a radius "r" from said main vertical axis,
- at least one freely rotatable wheel having a wheel axis connected to said upstanding auxiliary bowl for holding said wheel axis stationary,
- said wheel having a perimeter rolling against said exterior friction drive surface of radius r,
- a driven rotor member rotatable about said main vertical axis and having an interior friction drive surface concentric with said main vertical axis,
- said interior friction drive surface having a radius "R" from said main vertical axis, and said radius R being larger than said radius r,
- said perimeter of said wheel rolling against said interior friction drive surface of radius R for turning said driven rotor member at a second rotational speed which is less than said first rotational speed as a function of radius r divided by radius R,
- a rotatable basket positioned within said upstanding auxiliary bowl and being rotatable around said main vertical axis, and
- said rotatable basket being coupled to said driven rotor member for rotation therewith at said second rotational speed.

2. For use with a food processor, salad spinner apparatus as claimed in claim 1, in which:
the ratio of radius "r" to radius "R" is in the range of about 0.10 to about 0.30 for providing said second rotational speed in the range of about 165 RPM to about 540 RPM.

3. For use with a food processor, salad spinner apparatus as claimed in claim 1, in which:
said rotatable basket is coupled to said driven member by frictional engagement.

4. For use with a food processor, salad spinner apparatus as claimed in claim 1, in which:
said driven member has a downwardly outwardly tapered outer surface of generally conical configuration,
said basket has a hollow hub with an inner surface of generally conical configuration conforming with the outer surface of said driven member for providing frictional engagement taper fit of clutch-like frictional engagement.

5. For use with a food processor, salad spinner apparatus as claimed in claim 4, in which:
said hollow hub frictionally engages in taper fit with said driven member under gravitational loading due to the weight of the basket plus its contents.

6. For use with a food processor, salad spinner apparatus as claimed in claim 1, in which:
a plurality of freely rotatable wheels are equally spaced about said vertical axis.

7. For use with a food processor, salad spinner apparatus as claimed in claim 1, in which:
said wheel axis slopes downwardly and outwardly at an angle "A" relative to said main vertical axis, and
said angle A is in the range from about 15° to about 45°.

8. For use with a food processor, salad spinner apparatus as claimed in claim 6, in which:
said wheels each have a wheel axis sloping downwardly at the same angle "A" to said main vertical axis, and
said angle A is in the range from about 15° to about 45°.

9. For use with a food processor, the salad spinner apparatus as claimed in claim 1, in which said exterior friction drive surface on said coupling sleeve is formed by a downwardly and outwardly flared skirt near the lower end of said coupling sleeve.

10. For use with a food processor, the salad spinner apparatus as claimed in claim 9, in which:
a compression spring is seated between said tool drive means and said coupling sleeve for thrusting said coupling sleeve upwardly thereby spring-loading said flared skirt against the perimeter of said wheel for increasing the frictional engagement therebetween.

11. For use with a food processor, the salad spinner apparatus as claimed in claim 6, in which:
said interior friction drive surface of said rotor member slopes downwardly and outwardly,
said rotor member is rotatably mounted on said auxiliary bowl with vertical clearance for enabling the force of gravitation to urge said rotor member downwardly against the perimeter of said wheels.

12. For use with a food processor, the salad spinner apparatus as claimed in claim 1, in which said wheel has a high friction tire.

13. For use with a food processor, the salad spinner apparatus as claimed in claim 12, in which said tire is an O-ring selected from a group of materials including rubber, neoprene, and polyurethane.

14. A salad spinner dryer attachment for a food processor of the type having a base housing containing an electrical motor drive, said base housing having a deck on which a working bowl is adapted to be removably engaged in a predetermined fixed position, said motor drive having a rotatable drive shaft extending vertically upwardly from said deck and being rotatable around a main axis of rotation by a motor drive at a predetermined first rotational speed, said salad dryer attachment comprising:
- an auxiliary bowl having a central concavity to accommodate receipt of said rotatable drive shaft when said auxiliary bowl is mounted on said deck in said predetermined fixed posi- tion,
- a bottom trough in said auxiliary bowl for capturing and retaining water which is caught by said auxiliary bowl during a salad spinning drying operation,
- a perforated basket rotatably mounted in said auxiliary bowl for turning about said main axis,
- a removable coupling sleeve engageable with said rotatable drive shaft and having an exterior friction drive surface concentric with said main axis of rotation,
- speed-reduction wheel means having a wheel perimeter frictionally coupled between said exterior friction drive surface at a radius "r" from said main axis and an interior friction drive surface at a radius "R" from said main axis larger than r, said interior friction drive surface being associated with said rotatable basket for frictionally driving said rotatable basket, said speed-reduction wheel means having a stationary axis of rotation different from said first axis of rotation, whereby the speed reduction is provided as a function of r/R and whereby wet salad greens placed in said perforated rotatable basket are spun dry with removed water being collected in the trough of said auxiliary bowl.

15. The salad spinner dryer attachment as claimed in claim 14, including:

a rotor member rotatable about said first axis of rotation and having an interior friction drive surface concentric with said first axis of rotation and spaced further from said first axis of rotation that said exterior friction drive surface of said coupling sleeve, said rotatable basket and said rotor member having complementary configuration for said rotatable basket when positioned on said rotor member to frictionally engage said rotor member to be driven thereby, and said wheel means being positioned with its perimeter frictionally engaging said interior friction drive surface on said rotor member and said exterior friction drive surface of said coupling sleeve, whereby said rotor member is thereby driven at a reduced speed relative to said coupling sleeve for turning said basket about said axis at said reduced speed.

16. The salad dryer attachment as claimed in claim 15, in which:

said wheel means comprise three freely rotatable wheels uniformly spaced about said main axis of rotation.

17. The salad dryer attachment as claimed in claim 16, in which:

said rotor member has a downwardly, outwardly tapered outer surface of a generally conical configuration, said basket has a hollow hub with generally conical inner surface conforming with the outer surface of said rotor member thereby providing a clutch-like frictional engagement with said rotor member.

18. The salad dryer attachment as claimed in claim 14, in which:

said speed-reduction wheel means comprise a plurality of wheels, and each of said wheels has an axis of rotation sloping relative to said main axis.

19. The salad dryer attachment as claimed in claim 18, in which:

the axis of rotation of each of said wheels slopes at an angle in the range from about 15° to about 45° relative to said main axis.

20. The salad dryer attachment as claimed in claim 14, in which:

the ratio of radius "r" to radius "R" is in the range from about 0.10 to about 0.30.

* * * * *